United States Patent [19]

Bauman

[11] 3,928,618

[45] Dec. 23, 1975

[54] ORAL COMPOSITIONS

[75] Inventor: Robert Andrew Bauman, New Brunswick, N.J.

[73] Assignee: Colgate-Palmolive Company, New York, N.Y.

[22] Filed: Mar. 21, 1974

[21] Appl. No.: 453,359

Related U.S. Application Data

[63] Continuation-in-part of Ser. No. 242,750, April 10, 1972.

[52] U.S. Cl. .................................. 424/311; 424/58
[51] Int. Cl.² ......................................... A61K 31/22
[58] Field of Search .............................. 424/58, 311

[56] References Cited
UNITED STATES PATENTS

| | | | |
|---|---|---|---|
| 3,223,704 | 12/1965 | Shibe et al. | 424/54 |
| 3,369,046 | 2/1968 | Kaniecki et al. | 424/54 |
| 3,431,208 | 3/1969 | Bailey | 424/54 |
| 3,703,583 | 11/1972 | Martin | 424/54 |

*Primary Examiner*—Jerome D. Goldberg
*Attorney, Agent, or Firm*—Herbert S. Sylvester; Murray M. Grill; Robert L. Stone

[57] ABSTRACT

Novel oral compositions possessing anti-microbial, anti-caries and anti-calculus properties containing a quaternary ammonium aryl ester and a non-ionic organic surfactant as essential ingredients.

6 Claims, No Drawings

ORAL COMPOSITIONS

The present application is a continuation-in-part of copending application Ser. No. 242,750, filed Apr. 10, 1972.

The present invention relates to novel compositions consisting essentially of a non-ionic organic surfactant and a quaternary ammonium aryl ester represented by the general formula:

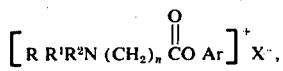

wherein R is a long chain alkyl group of 12–18 carbon atoms, $R^1$ and $R^2$ are methyl or ethyl groups, $n$ is an integer from 1 to 6, Ar is an aryl radical comprising a phenyl, naphthyl or substituted phenyl or naphthyl wherein said substituents include lower alkyl, lower alkoxy, halo- and/or nitro-radicals, and X is a compatible anion such as the halides, sulfates, methosulfates, etc. These quaternary compounds possess superior anti-microbial, anti-caries, and anti-calculus activity, are mild, substantially non-toxic and completely compatible with the non-ionic surfactant ingredient.

Typical examples of the quaternary ammonium compounds embraced by this invention include:
1. 3-p-cresoxycarbonyl)propyldimethyltetradecylammonium bromide
2. phenoxycarbonylmethyldimethyltetradecylammonium bromide
3. 3-(phenoxycarbonyl)propyldimethyltetradecylammonium bromide
4. 3-(phenoxycarbonyl)propyldimethyldodecylammonium bromide
5. phenoxycarbonylmethyldimethyldodecylammonium bromide
6. p-nitrophenoxycarbonylmethyldimethyltetradecylammonium bromide
7. 3-(p-nitrophenoxycarbonyl)propyldimethyldodecylammonium bromide
8. 3-(p-nitrophenoxycarbonyl)propyldimethyltetradecylammonium bromide
9. 3-(2',4',6' trichlorophenoxycarbonyl)propyldimethyldodecylammonium bromide
10. 3-(2',4',6' trichlorophenoxycarbonyl)propyldimethyltetradecyl ammonium bromide
11. 3-(p-cresoxycarbonyl)propyltetradecyldimethyl ammonium chloride
12. 3-(2',4',6' trichlorophenoxycarbonyl)propyldimethyltetradecyl ammonium iodide.
13. 5-(p-cresoxycarbonyl)pentyldimethylhexadecyl ammonium chloride
14. 6-(phenoxycarbonyl)hexyldiethyloctadecyl ammonium bromide
15. 4-(p-nitrophenoxycarbonyl)butyldimethylhexadecyl ammonium bromide
16. 2-naphthyloxycarbonylmethyldimethyltetradecyl ammonium bromide
17. 1-naphthyloxy carbonylmethyldimethyldodecyl ammonium bromide.

The halides, such as the fluorides, the sulfates and methosulfates, and analogous compounds, may also be employed herein as effective antibactericides.

It has been observed that the compounds generally described by the foregoing formula are particularly effective against gram positive organisms such as *Staphylococcus aureus*, *Streptococcus mitis*, *Bacillus subtilis* and *Corynebacterium acnes*.

The anti-microbial nature of instant quaternary ammonium arylesters was shown by a standard test tube serial dilution test in which an appropriate number of test tubes of broth containing decreasing concentrations of the test agent was innoculated with the test organism. The test agent was initially at a 1.0% concentration in ethanol which was progressively diluted, first tenfold, and then twofold, each time with broth. The broth employed contained 17 gm of trypticase peptone, 3 gm of phytone peptone, 5 gm of sodium chloride, 2.5 gm of dipotassium phosphate, 2.5 gm of dextrose and water to 1 liter. After a suitable period of incubation, the tubes were examined for the presence or absence of growth. The activity of the test agent was the lowest concentration which inhibited the growth of the organism and is expressed as the minimal inhibitory concentration in ug/ml.

TABLE I

| Compound No. | Minimum Inhibitory Concentration (µg/ml) | |
|---|---|---|
| | S. aureus | S mitis (S-3) |
| 1 | 0.78 | 3.12 |
| 2 | 12.5 | 6.25 |
| 3 | 0.78 | 1.56 |
| 4 | 3.12 | 12.5 |
| 5 | 12.5 | 25 |
| 6 | 6.25 | 12.5 |
| 7 | 6.25 | 25 |
| 8 | 0.78 | 6.25 |
| 9 | 12.5 | 3.12 |
| 10 | 6.25 | 3.12 |

These dilution tests evidence the bacteriostatic effectiveness of aforesaid aryl esters against gram positive bacteria.

Another essential ingredient of instant composition is a non-ionic organic surfactant which provides increased prophylactic action, assists in achieving thorough and complete dispersion of instant compositions throughout the oral cavity and renders instant compositions more cosmetically acceptable. The non-ionic surfactant imparts to the composition, detersive and foaming properties as well as maintains the flavoring materials in solution (i.e. solubilizes flavor oils). In addition, the non-ionics are completely compatible with the quaternary ammonium aryl esters, thereby providing for a stable, homogeneous composition of enhanced anti-bacterial, anti-caries and anti-calculus activity. The presence of an anionic surfactant would inactivate or negate the beneficial affects of said quaternary compounds by coprecipitation and/or interreaction.

The nonionic organic surface active compounds which are contemplated are commercially known and comprise the water-soluble products which are derived from the condensation of an alkylene oxide or equivalent reactant and a reactive-hydrogen hydrophobe. The hydrophobic organic compounds may be aliphatic, aromatic or heterocyclic, although the first two classes are preferred. The preferred types of hydrophobes are higher aliphatic alcohols and alkyl phenols, although others may be used such as carboxylic acids, carboxamides, mercaptans, sulphonamides, etc. The ethylene oxide condensates with higher-alkyl phenols represent a preferred class of nonionic compounds. Usually the hydrophobic moiety should contain at least about 6 carbon atoms, and preferably at least about 8 carbon atoms, and may contain as many as about 50 carbon atoms or more. The amount of alkylene oxide will vary considerably depending upon the hydrophobe, but as a general guide and rule, at least about 5 moles of alkylene oxide per mole of hydrophobe should be used. The upper limit of alkylene oxide will vary, also, but no particular criticality can be ascribed thereto. As much as 200 or more moles of alkylene oxide per mole of hydrophobe may be employed. While ethylene oxide is the preferred and predominating oxyalkylating reagent, other lower alkylene oxides such as propylene oxide, butylene oxide, and the like may also be used or substituted in part for the ethylene oxide. Other nonionic compounds which are suitable are the polyoxyalkylene esters of the organic acids such as the higher fatty acids, the rosin acids, tall oil acids, acids from petroleum oxidation products, etc. These esters will usually contain from about 10 to about 22 carbon atoms in the acid moiety and from about 12 to about 30 moles of ethylene oxide or its equivalent.

Still other nonionic surfactants are the alkylene oxide condensates with the higher fatty acid amides. The fatty acid group will generally contain from about 8 to about 22 carbon atoms and this will be condensed with about 10 to about 50 moles of ethylene oxide as the preferred illustration. The corresponding carboxamides and sulphonamides may also be used as substantial equivalents.

Still another class of nonionic products are the oxyalkylated higher aliphatic alcohols. The fatty alcohols should contain at least 6 carbon atoms, and preferably at least about 8 carbon atoms. The most preferred alcohols are lauryl, myristyl, cetyl, stearyl and oleyl alcohols and the said alcohols should be condensed with at least about 6 moles of ethylene oxide, and preferably about 10 to 30 moles of ethylene oxide. A typical nonionic product is oleyl alcohol condensed with 15 moles of ethylene oxide. The corresponding alkyl mercaptans when condensed with ethylene oxide are also suitable in the compositions of the present invention.

The amount of non-ionic may generally be varied from about 0.2 – 3.0% by weight of the total formulation, depending on the specific nature of the non-ionic utilized as well as on the amounts, and nature of the other ingredients in the oral formulation.

When used against bacteria, compositions of instant invention may be applied directly to the surface to be protected or may be dissolved in a pharmaceutical carrier. Typically, effective amounts, e.g., 0.01 to about 5% by weight of the aryl ester and 0.2 to about 3% by weight non-ionic surfactant are included in an inert carrier. Suitable inert solid carriers include talc, clay, diatomaceous earth, flour, etc.

The quaternary ammonium aryl esters of instant invention are particularly effective in inhibiting the development of dental calculus as shown by the results of tests on litter-mated albino rats, in groups of 15 males and 15 females, who were fed a Zipkin-McClure calculus producing diet. For 6 weeks, the teeth of each animal were swabbed for thirty seconds each day with a 0.1% concentration test solution or water for the control group. The animals were then sacrificed, defleshed, and scored by Baer's method for calculus. The results were analyzed by Student's "t" test and in the results quoted were 99% significant.

TABLE II

| Compound No. | Calculus Reduction |
|---|---|
| 1 | 18.7% |
| 1 | 35.8 |
| 2 | 17.1 |
| 3 | 20.8 |
| 9 | 19.5 |
| 10 | 34.4 |

The results set forth above indicate the significant effectiveness of the quaternary compounds of the invention in inhibiting formation of oral calculus in concentrations as low as 0.1%.

A theoretical explanation for this effectiveness resides in the possible reactivity of the aryl esters with the amino or other group in the protein molecule of plaque to chemically modify plaque and inhibit calculus. The presence of the quaternary ammonium group in aforesaid esters provides substantivity before reaction occurs. More specifically, plaque-reactive compounds have a quaternary ammonium group to provide a temporary binding to the organic constituents of plaque and a reactive site for permanent attachment, whereby the compound is held until the reactive group, namely the aryl ester, has formed a more permanent bond with some atom or group in the protein or carbohydrate of the plaque. Laboratory tests have shown that instant quaternary esters react rapidly with amine groups (i.e., in protein) to form amides, the rate of reaction, however, varying with the particular ester utilized. In addition to the protein breakdown via the amide bond, the quaternary ammonium group may increase the solubility of the plaque, thereby rendering the plaque more dispersible and consequently easily removable from the teeth.

Instant quaternary compounds are also effective in reducing caries, as shown by the results of tests on litter-mated caries-susceptible hamsters, in groups of 15 males and 15 females, who were fed a Mitchell cariogenic diet and received constant deionized water. For 6 weeks, the teeth of each animal were swabbed for thirty seconds each day with a 0.1% concentration test solution or water for the control group. The animals were then sacrificed, defleshed, and scored by a modified version of the Keyes scoring method. Mean averages and percentage changes from the control were determined and tested statistically to determine the significance.

TABLE III

| Compound No. | Caries Reduction | Statistical Significance |
|---|---|---|
| 1 | 52.4% | 99% |
| 2 | 30.6 | — |
| 10 | 49.5 | 95% |

These results are indicative of the significant effectiveness of instant quaternary compounds in the reduction of caries in concentrations as low as 0.1%.

Instant oral compositions, which reduce the formation of caries and inhibit the formation of oral calculus, contain effective amounts up to about 5% by weight, preferably 0.01–1%, and most preferably 0.025–0.5% by weight of the arylester.

Typically, the oral preparation is a dentifrice, such as a dental cream, tablet or powder, containing as a vehicle about 20–95% by weight of a water-insoluble polishing material, preferably including water-insoluble phosphate such as dicalcium phosphate, tricalcium phosphate, trimagnesium phosphate, calcium pyrophosphate, dimagnesium phosphate and calcium carbonate. The dentifrice may also include water, binders such as glycerine, sorbitol, propylene glycol, and polyethylene glycol 400; gelling agents such as natural and synthetic gums inclusive of gum tragacanth, Irish moss, sodium carboxymethyl cellulose, hydroxyethyl carboxymethyl cellulose, polyvinyl pyrrolidone, starch, water-soluble hydrophilic colloidal carboxyvinyl polymers, such as those sold under the trademark "Carbopol" and synthetic inorganic silicated clays; additional antibacterial agents; coloring or whitening agents; preservatives; silicones; chlorophyl compounds; additional ammoniated materials; etc. The adjuvants are incorporated in instant compositions in amounts which do not adversely affect the anti-microbial properties thereof.

Any suitable flavouring or sweetening materials may be employed in formulating a flavour for the compositions of the present invention. Examples of suitable flavouring constituents include the flavouring oils, e.g., oils of spearmint, peppermint, wintergreen, sassafras, clove, sage, eucalyptus, marjoram, cinnamon, lemon and orange, as well as sodium methylsalicylate. Suitable sweetening agents include sucrose, lactose, maltose, sorbitol, sodium cyclamate, perillartine and saccharine. Suitably, flavour and sweetening agents may together comprise from about 0.1 to 5% or more by weight of the compositions of the instant invention.

The compositions of the present invention may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride ($SnF_2$-KF), potassium fluorozirconate, sodium hexafluorostannate, stannous chlorofluoride, and sodium monofluorophosphate. These materials, which dissociate or release fluorine-containing ions, suitably may be present in an effective but non-toxic amount, usually within the range of about 0.01 to 1% by weight of the water-soluble fluorine content thereof. Sodium fluoride, stannous fluoride and sodium monofluorophosphate are particularly preferred, as well as mixtures thereof.

A dental cream, in accordance with instant invention, may typically contain about 0.5–2.0% non-ionic organic surfactant; 0.01–5.0% quaternary ammonium aryl ester; 15–30% glycerine; 0.7–1.0% carboxymethylcellulose; 2.5–7.5% calcium carbonate and 40–50% dicalcium phosphate dihydrate plus 0.1–5.0% flavouring and/or sweeting materials.

The oral preparation may also be a liquid such as mouth rinse, which typically contains 20–99% by weight of an aqueous lower aliphatic alcohol such as ethanol, n-propyl, or isopropyl alcohol, said alcohol being present in amounts of about 5–30% by weight of the oral preparation. Instant mouth rinses may also contain thickening agents such as glycerine and sweetening and/or flavouring agents.

Such oral preparations are typically applied by brushing the teeth or rinsing the oral cavity for 30–90 seconds at least once daily. Typical oral preparations of the invention which can be applied in this manner are set forth below.

EXAMPLE 1

| Dental Cream | % |
|---|---|
| 3-(p-cresoxycarbonyl)propyldimethyltetradecylammonium bromide | 0.50 |
| Nonionic detergent* | 1.00 |
| Glycerine | 22.00 |
| Sodium pyrophosphate | 0.25 |
| Carboxymethyl cellulose | 0.85 |
| Sodium saccharin | 0.20 |
| Sodium benzoate | 0.50 |
| Calcium carbonate (precipitated) | 5.00 |
| Dicalcium phosphate dihydrate | 46.75 |
| Flavor | 0.80 |
| Water | 22.15 |

*Tween 80 - Polyoxyethylene (20 moles ethylene oxide) sorbitan monooleate.

EXAMPLE 2

| Mouthwash | % |
|---|---|
| Compound No. 1 | 0.25 |
| Nonionic detergent (Pluronic F-68)* | 1.00 |
| Ethyl alcohol (containing flavor) | 15.00 |
| Glycerine | 10.00 |
| Saccharin | 0.02 |
| Water | 73.73 |

*Block polymer of 80% polyoxyethylene and 20% polyoxypropylene.

In lieu of Compound No. 1, any of the listed 17 quaternary compounds and analagous compounds may be incorporated into above or similar dentifrice or mouth rinse formulations to provide protection against plaque formation, calculus and/or caries.

EXAMPLE 3

| Mouth Rinse | % |
|---|---|
| Ethyl Alcohol (containing flavor oils) | 15.00 |
| Nonionic detergent (Pluronic F-108)* | 3.0 |
| Glycerin | 10.0 |
| (phenoxycarbonylmethyl)dimethyltetradecyl ammonium bromide | 0.025 |
| Sodium Saccharin | 0.02 |
| Dye | 0.0006 |
| Deionized Water | 71.9544 |

*Block polymer of polyoxyethylene and polyoxypropylene similar to that in Example 2.

Instant quaternary ammonium arylesters can be prepared by a two-step process of reacting essentially equimolar quantities of a phenol or naphthol with a haloalkanoic acid, or salt of a phenol or naphthol with a haloalkanoyl halide to form an aryl halo-alkanoate; followed by reacting with essentially an equimolar amount of a tertiary amine to form the quaternary ammonium salt, as illustrated by the following equations:

1. $CH_3\text{-}C_6H_4\text{-}OH + Cl(CH_2)_3COOH \rightarrow CH_3\text{-}C_6H_4\text{-}OC(O)(CH_2)_3Cl + H_2O$ 2. $CH_3\text{-}C_6H_4\text{-}OCO(CH_2)_3Cl + C_{14}H_{29}N(CH_3)_2 \rightarrow [CH_3\text{-}C_6H_4\text{-}OCO(CH_2)_3N(CH_3)_2C_{14}H_{29}]\ Cl$ A salt of a phenol may be used in lieu of the phenol in Step 1, as shown below:

3. 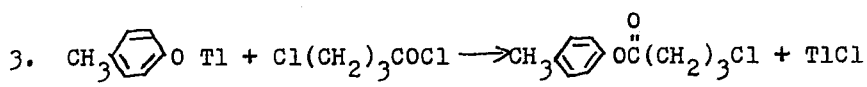

The phenol salt may be obtained by the reaction illustrated by the following equation:

4. 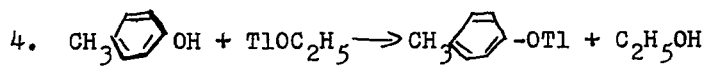

Other phenolic salts may be used in lieu of thallous phenolate, inclusive of the alkali metal phenolic salts, etc. as the reactant with a halo-alkanoyl halide in accordance with Equation 3. The preferred process utilizes the phenol or naphthol reactant as illustrated by Equation 1.

The following examples illustrate the manner in which the quaternary ammonium aryl esters are prepared.

EXAMPLE 4

Preparation of phenoxycarbonylmethyltetradecyldimethyl ammonium bromide:

Compound 2. 

To a solution of 37.6 g (0.40 mol) phenol in 600 ml of ether was added with stirring 100 g (0.40 mol) of thallous ethoxide. The white precipitate of 120 g thallous phenoxide was removed by filtration and dried in vacuum. To a solution of 80.9 g (0.40 mol) bromoacetyl bromide in 1 liter of ether was added portionwise with stirring 120 g (0.40 mol) of thallous phenoxide. After standing overnight, the reaction mixture was filtered from thallous bromide, washed with water until neutral, and then dried over Drierite. After removal of the ether, the phenyl bromoacetate was distilled through a short Vigreux column and product was collected from 80°–86° (1.3 T).

A mixture of 55 g (0.26 mol) phenyl bromoacetate and 62 g (0.26 mol) of tetradecyldimethylamine was allowed to stand at room temperature for 3 days. The resultant crystalline mass was washed well with ether and dried to 114 g. Recrystallized from ethyl acetate and vacuum dried, the compound melted at 87°–91.5°.

Analysis: Calculated for $C_{24}H_{42}BrNO_2$: C, 63.14; H, 9.27; Br, 17.50.

Found: C, 62.88; H, 9.14; Br, 17.61.

EXAMPLE 5

Other compounds prepared in accordance with the procedure of Example 3 include:

|   |   | M.P. | % Br Calcd. | Found |
|---|---|---|---|---|
| 1. | [CH₃ ⌬ OCO(CH₂)₃N(CH₃)₂C₁₄H₂₉] Br | 104–108° | 16.03 | 15.98 |
| 3. | [⌬ OCO(CH₂)₃N(CH₃)₂C₁₄H₂₉] Br | 89–92.5° | 16.49 | 16.42 |
| 4. | [⌬ OCO(CH₂)₃N(CH₃)₂C₁₂H₂₅] Br | 84–89.5° | 17.50 | 17.48 |
| 5. | [⌬ OCOCH₂N(CH₃)₂C₁₂H₂₅] Br | 76–81° | 18.65 | 18.63 |
| 6. | [NO₂⌬ OCOCH₂N(CH₃)₂C₁₄H₂₉] Br | 119–120° | 15.93 | 15.86 |
| 7. | [NO₂⌬ OCO(CH₂)₃N(CH₃)₂C₁₂H₂₅] Br | — | 15.93 | 15.84 |
| 8. | [NO₂⌬ OCO(CH₂)₃N(CH₃)₂C₁₄H₂₉] Br | 120–2° | 15.09 | 15.08 |
| 9. | [Cl ⌬ Cl/Cl OCO(CH₂)₃N(CH₃)₂C₁₂H₂₅] Br | 139–146° | 14.23 | 14.25 |
| 10. | [Cl ⌬ Cl/Cl OCO(CH₂)₃N(CH₃)₂C₁₄H₂₉] Br | 152–5° | 13.59 | 13.84 |

EXAMPLE 6

Preparation of 3-(p-cresoxycarbonyl)propyltetradecyldimethyl ammonium chloride:

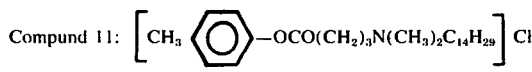

In a 2 liter one-neck flask fitted with a Dean-Stark trap and a reflux condenser were placed 84.7 g (0.78 mol) p-cresol, 87.4 g (0.71 mol) 4-chlorobutyric acid, 875 ml toluene, and 1 ml concentrated sulfuric acid. The mixture was refluxed for 3 days. After neutralizing the acid with 6 g of sodium bicarbonate, the reaction mixture was filtered, and the solvent removed by vacuum evaporation. The residue was distilled through a 15 inch Vigreux column to yield 106 g of colorless oil boiling at 144° (4T), and confirmed by infrared and nmr spectra as p-cresyl 4-chlorobutyrate.

A mixture of 89.5 g (0.42 mol) p-cresyl 4-chlorobutyrate and 102.0 g (0.42 mol) tetradecyldimethylamine was prepared in a 500 ml Erlenmeyer flask, stoppered and placed in an oven at 100° for 3 days. After cooling to room temperature, the crystalline mass was slurried with ether, filtered, and dried to 145 g. The product was recrystallized from ethyl acetate; m.p. 110°–114° to a liquid crystal, 166°–167° to a clear liquid.

Analysis: Calculated for $C_{27}H_{48}ClNO_2$: C, 71.41; H, 10.65; Cl, 7.81.

Found: C, 71.43; H, 10.78; Cl, 7.83.

Although this invention has been described with reference to specific examples, it will be appparent to one skilled in the art that various modifications may be made thereto which fall within its scope.

What is claimed is:

1. An anti-microbial, anti-caries and anti-calculus oral composition consisting essentially of about 0.2–3% by weight of a nonionic organic surfactant and 0.01 to about 5% by weight of a quaternary ammonium aryl ester having the formula:

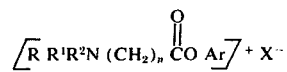

wherein R is a long chain alkyl of 12–18 carbon atoms, $R^1$ and $R^2$ are selected from the group consisting of methyl and ethyl, n is an integer from 1 to 6, Ar is an aryl selected from the group consisting of phenyl, naphthyl and phenyl and naphthyl substituted by a moiety selected from the group consisting of tri-halo and mono-nitro; and X is an anion selected from the group consisting of halide, sulfate and methosulfate, said nonionic organic surfactant being compatible with said quaternary ammonium aryl ester.

2. A composition as set forth in claim 1, wherein the quaternary ammonium aryl ester is

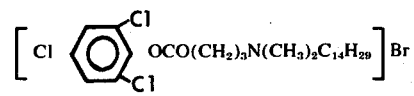

3. A composition as set forth in claim 1, wherein the quaternary ammonium aryl ester is

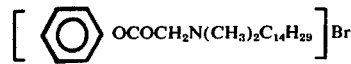

4. A composition as set forth in claim 1, containing 3-(p-cresoxycarbonyl)propyldimethyltetradecyl ammonium chloride.

5. A composition as set forth in claim 1 also containing about 0.1–5% by weight of a flavoring oil.

6. A composition as set forth in claim 1 containing 0.1–5% by weight sweetener and flavoring oil.

* * * * *